United States Patent [19]
Ono

[11] Patent Number: 5,943,002
[45] Date of Patent: Aug. 24, 1999

[54] MICROWAVE DETECTOR FOR VEHICLES

[75] Inventor: Hisao Ono, Tokyo, Japan

[73] Assignee: Yupiteru Industries, Co., Ltd., Japan

[21] Appl. No.: 09/042,217

[22] Filed: Mar. 13, 1998

[30] Foreign Application Priority Data

Mar. 27, 1997 [JP] Japan ................................. 9-002683

[51] Int. Cl.[6] .................................................. G01S 7/285
[52] U.S. Cl. ............................................................ 342/20
[58] Field of Search ....................... 342/70, 20; 455/345, 455/346, 348, 349, 347

[56] References Cited

U.S. PATENT DOCUMENTS 4,196,393  4/1980  Schweitzer ................................ 342/20
5,049,884  9/1991  Jaeger et al. ............................. 342/20
5,717,398  2/1998  Pollin ...................................... 342/20

*Primary Examiner*—Ian J. Lobo
*Attorney, Agent, or Firm*—Marger Johnson & McCollom, P.C.

[57] ABSTRACT

An open-space battery housing portion 9a is integrally formed in a portion of a connecting mechanism 11 of a device main body 1 to house a secondary battery 6 between a main circuit substrate 3 and a connecting plate 22 when the connecting plate 22 is coupled with the connecting mechanism 11, in which the connecting plate 22 also serves as a cover member for the battery housing portion 9a, whereby the secondary battery 6 can be removed from the battery housing portion 9a when the connecting plate 22 is uncoupled from the connecting mechanism 11.

4 Claims, 3 Drawing Sheets

MICROWAVE DETECTOR FOR VEHICLES

BACKGROUND OF THE INVENTION

1. Field of the Invention

The present invention relates to a vehicular microwave detector which is mounted in general automobiles to emit an alarm to the driver upon detecting a prescribed microwave that reaches the detector from the outside, and in particular relates to a vehicular microwave detector which is powered by a solar cell panel and secondary battery provided in the detector.

2. Description of the Prior Art

Vehicular microwave detectors which are mounted to the dashboard or front windshield of an automobile by a pressure sensitive adhesive sheet or suction cup are well known in the prior art as a means of generating an alarm upon detecting the microwaves emitted by a laser type speed measuring device. The circuit structure of such detectors are equipped with a horn antenna and a super-heterodyne type receiving circuit at the front end, with control being carried out by a microcomputer, so that when a prescribed microwave band is discriminated an alarm is generated by means of a buzzer, LED lamp or the like.

Shown in FIG. 1 is the structure of a representative example of a type of prior art vehicular microwave detector equipped with a solar cell panel and secondary battery as a power source. As shown in the same drawing, the device comprises a device main body 1 constructed from a flat case and a vehicle interior mounting bracket 2 which can be removably coupled with the underside of the device main body 1. The bracket 2 is equipped with a base plate 21 which is fixed to a surface inside an automobile such as the surface of the dashboard or the inside surface of the front windshield, a connecting plate 22 which can be removably linked with a connecting mechanism 11 integrally formed in the underside case of the device main body 1, and a joint mechanism 23 which links the connecting plate 22 with the base plate 21. In this connection, FIG. 1(A) shows the device main body 1 and the bracket 2 in a coupled state, and FIG. 1(B) shows these elements in a separated state.

Inside the device main body 1, a main circuit substrate 3 is arranged along the bottom surface of the case, with an aperture portion of the horn antenna installed in this main circuit substrate 3 provided so as to face one side surface of the main body case. Further, a solar cell panel 5 is arranged along the case front surface of the device main body 1 so as to be exposed to outside light, whereby the solar cell panel 5 and the secondary battery 6 which is charged by the output of the solar cell panel 5 form the power source of the microwave detector. Furthermore, a human interface control portion 7 and a display portion 8 are arranged on the side portion opposite the direction of the horn antenna 4 and the front surface portion of the device main body 1. The control portion 7 is mainly comprised of a key switch panel equipped with a number of keys, and the display portion 8 is equipped with a number of LED lamps. Moreover, although omitted from the drawings, the main circuit substrate 3 is provided with a high frequency circuit for processing signals received from the horn antenna 4 and a signal processing circuit for microcomputer control. Further, the secondary battery 6 of the power source is set in a battery housing portion on the main body circuit substrate 3 inside the device main body 1, with the secondary battery 6 being connected to the solar cell panel 5 and a stabilizing power circuit on the substrate 3.

This type of vehicular microwave detector is generally purchased by a user who installs it in his or her own automobile. There are two main types of base plates 21 for the bracket 2, wherein in the first type the base plate 21 of the bracket 2 is mounted to the dashboard by a pressure sensitive adhesive sheet, and in the second type the base plate 21 is formed with a suction cup which is mounted to the inside surface of the front windshield. The device main body 1 is coupled to the connecting plate 22, and by adjusting the direction by means of the joint mechanism 23, the aperture of the horn antenna 4 can be made to face forward, and the control portion 7 and display portion 8 can be made to face the driver.

In the case of microwave detectors powered by a solar cell panel and a secondary battery, as described above, there is no need to frequently replace batteries as is required for types which use a primary battery. However, because even the secondary battery has a cycle life, it is necessary for such battery to be replaceable. Further, in the case of disposing of an exhausted microwave detectors the battery should be arranged so as to be easy to remove and recover. Thus, from this point of view as well, it is necessary to provide a structure which makes it possible to replace (or remove) the battery.

Now, in the prior art vehicular microwave detector shown in FIG. 1, the secondary battery 6 is set in a battery housing portion above the main circuit substrate 3 inside the device main body 1 and is connected to the solar cell panel 5 and a stabilizing power circuit above the substrate 3. With this structure, it is difficult to carry out an easy installation or removal of the internal battery, which requires removing an assembly screw and separating half of the case of the device main body 1 to expose the inside. In other words, in the example structure shown in FIG. 1, because the main circuit substrate 3 has a large surface area and is arranged below the battery 6, and because the solar cell panel 5 and the key switch panel of the control portion 7 is arranged above the battery 6, installation or removal of the battery 6 can not be carried out without separating half of the case. This results in an extremely troublesome operation.

SUMMARY OF THE INVENTION

In order to overcome the problems of the prior art described above, it is an object of the present invention to provide a vehicular microwave detector powered by a solar cell panel and a secondary battery with a structure that makes it possible to easily replace the secondary battery. It is another object of the present invention to provide a structure that makes it possible to inhibit the depletion of the battery.

In order to achieve these objects, the present invention provides a first embodiment of a microwave detector in which a battery housing portion is formed in a connecting mechanism portion. Accordingly, the height of the connecting mechanism portion provided in the bottom of a device main body is increased (i.e., it protrudes downward), and it becomes possible to house the secondary battery (which in the prior art was arranged between the contact points of the main circuit substrate and the case) within a battery housing portion positioned below the main circuit substrate. The battery housing portion has a bottom exposed portion which is closed by coupling the connecting plate with the connecting mechanism. In other words, the connecting mechanism is the main portion which includes the battery housing portion, and the connecting plate also serves as a cover member to cover the battery housing portion. Then, by uncoupling the connecting plate from the connecting mechanism, it is possible to remove or replace the secondary battery. An example of this first embodiment is illustrated in FIG. 2.

In a second embodiment of the present invention, an open-space battery housing portion for housing the secondary battery is integrally formed in the connecting plate, with a portion of the connecting mechanism of the device main body also serves as a cover member for the battery housing portion so that the battery housing portion is closed when the connecting plate is coupled with the connecting mechanism and open when the connecting plate is uncoupled from the connecting mechanism to enable the secondary battery to be removed from the battery housing portion. An example of this second embodiment is illustrated in FIG. 3.

In this case, the secondary battery can be electrically connected to the main circuit substrate and the solar cell panel by the use of various electrical connectors which are linked together when the connecting plate is coupled to the connecting mechanism, but preferably an electrical connection is established by the coupling of the connecting mechanism and the connecting plate, so that when these elements are in a coupled state, the secondary battery housed in the battery housing portion is electrically connected with the circuits in the device main body. In this way, an electrical connection can be established merely by coupling the connecting plate with the connecting mechanism.

In either of the these embodiments, by providing the battery housing portion in the connecting mechanism and/or the connecting plate, the uncoupling and coupling of the connecting plate with respect to the connecting mechanism known in the prior art can be utilized to open and close the battery housing portion without the need of a separate cover member for the battery housing portion, and thus by providing the solar cell panel on the top surface, the horn antenna and the main circuit substrate can be efficiently arranged inside the case portion to make the microwave device more compact and slim, while at the same time making it easy to open and close the battery housing portion. Accordingly, when the secondary battery is to be replaced, or when the secondary battery is to be removed when the product is eventually disposed of, the structure of the present invention makes it extremely easy to carry out such operations.

Further, because the secondary battery is arranged in a prescribed battery housing portion, the space above the main circuit substrate which was used in the prior art as a battery holding space becomes free space, and this makes it possible to construct an even slimmer device, and by changing the circuit pattern and the like it is possible to reduce the size of the substrate itself, which in turn makes it possible to reduce the size of the entire device.

Furthermore, with the solar cell panel provided on the top surface and the secondary battery housed in the battery housing portion in the bottom of the case, there is a separation of these elements. Accordingly, it is possible to achieve maximum resistance to temperature rises caused by heating due to direct or indirect contact of the secondary battery with sunlight. Consequently, it is possible suppress degradation of the discharge performance. In particular, in the case where the main circuit substrate is provided along the bottom of the device main body with the secondary battery housed below such main circuit substrate, by selecting an appropriate material which can function as a kind of heat insulator for the main circuit substrate, it is possible to suppress temperature rises of the secondary battery even further.

DETAILED DESCRIPTION OF THE PREFERRED EMBODIMENTS

Figure 1:
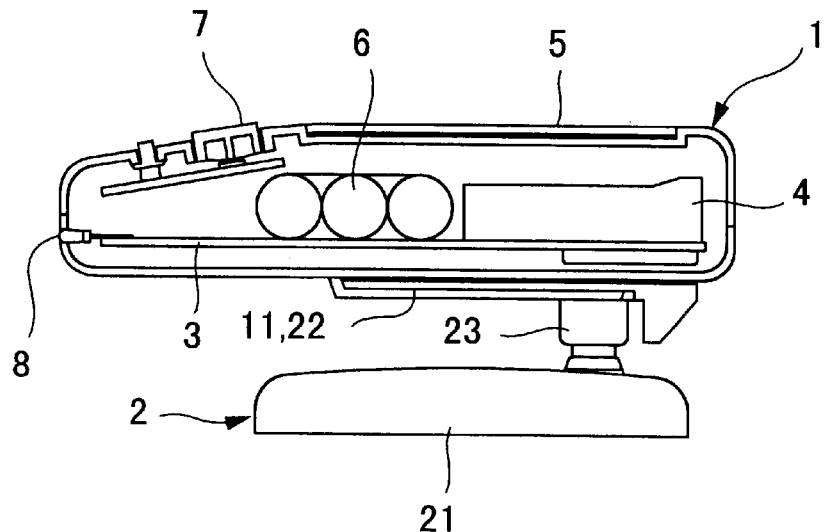
FIG. 1(A) shows the operational state of a prior art microwave detector for vehicles.
FIG. 1(B) shows the state in which the prior art microwave detector for vehicles is separated from a bracket for mounting the detector body.
Figure 1:
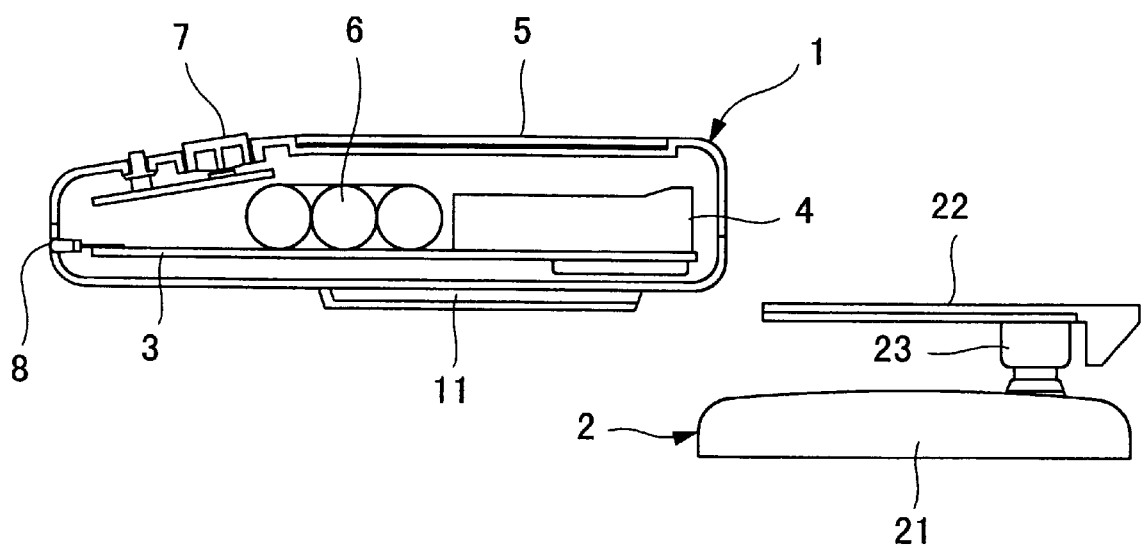
Figure 2:
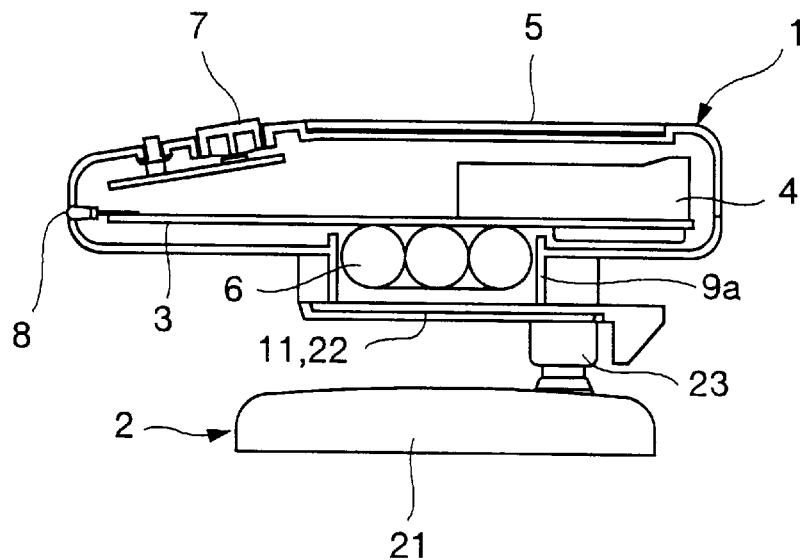
FIG. 2(A) shows the operational state of a microwave detector for vehicles according to a first embodiment of the present invention.
FIG. 2(B) shows the state in which the microwave detector for vehicles according to the first embodiment of the present invention is separated from a bracket for mounting the detector body.
Figure 2:
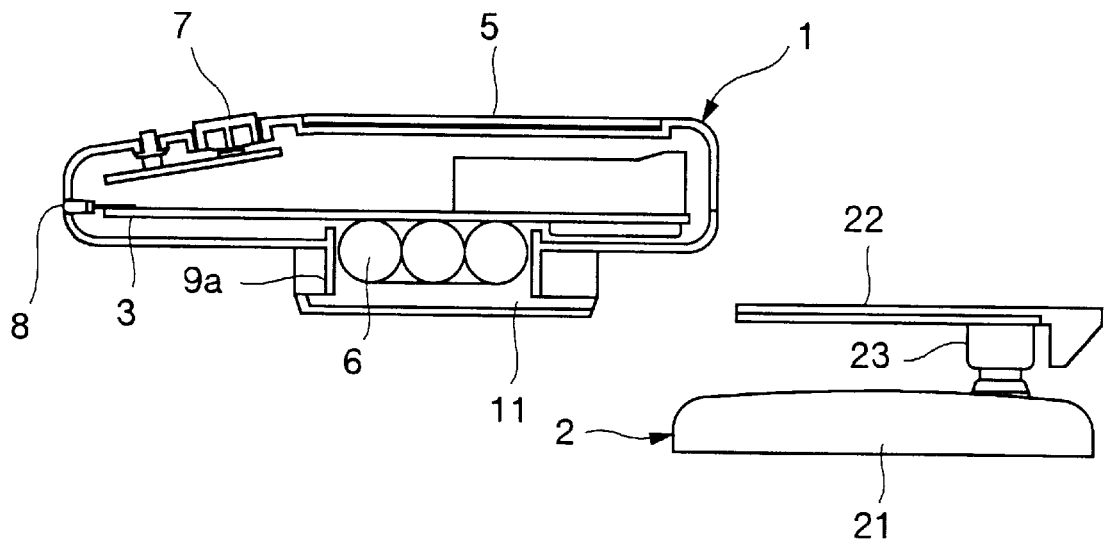

Shown in FIG. 2 is the structure of a first embodiment of vehicular microwave detector according to the present invention. As shown in this drawing, the device comprises a device main body 1 constructed from a flat case and a vehicle interior mounting bracket 2 which can be removably coupled with the underside of the device main body 1. The bracket 2 is equipped with a base plate 21 which is fixed to a surface inside an automobile such as the surface of the dashboard or the inside surface of the front windshield, a slide-type connecting plate 22 which can be removably linked with a connecting mechanism 11 integrally formed in the underside case of the device main body 1, and a joint mechanism 23 which links the connecting plate 22 with the base plate 21. In this connection, FIG. 2(A) shows the device main body 1 and the bracket 2 in a coupled state, and FIG. 2(B) shows these elements in a separated state.

Inside the device main body 1, a main circuit substrate 3 is arranged along the bottom surface of the case, with an aperture portion of the horn antenna installed in this main circuit substrate 3 provided so as to face one side surface of the main body case. Further, a solar cell panel 5 is arranged along the case top surface of the device main body 1 so as to be exposed to outside light, whereby the solar cell panel 5 and the secondary battery 6 which is charged by the output of the solar cell panel 5 form the power source of the microwave detector. Furthermore, a human interface control portion 7 and a display portion 8 are arranged on the side portion opposite the direction of the horn antenna 4 and the front surface portion of the device main body 1. The control portion 7 is mainly comprised of a key switch panel equipped with a number of keys, and the display portion 8 is equipped with a number of LED lamps. Moreover, although omitted from the drawings, the main circuit substrate 3 is provided with a high frequency circuit for processing signals received from the horn antenna 4 and a signal processing circuit for microcomputer control.

The special feature of this embodiment is as follows. An open-space battery housing portion 9a is integrally formed in a portion of the connecting mechanism 11 of the device main body 1 to house the secondary battery 6 between the main circuit substrate 3 and the connecting plate 22 when the connecting plate 22 is coupled with the connecting mechanism 11, in which the connecting plate 22 also serves as a cover member for the battery housing portion 9a, whereby the secondary battery 6 can be removed from the battery housing portion 9a when the connecting plate 22 is uncoupled from the connecting mechanism 11.

Figure 3:
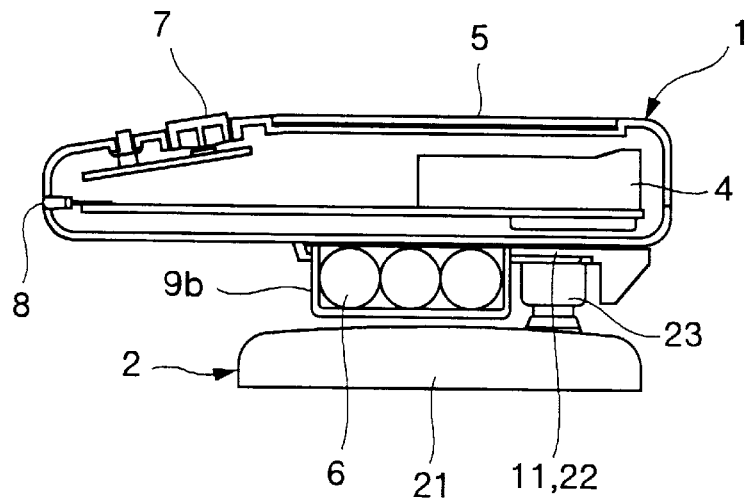
FIG. 3(A) shows the operational state of a microwave detector for vehicles according to a second embodiment of the present invention.
FIG. 3(B) shows the state in which the microwave detector for vehicles according to the second embodiment of the present invention is separated from a bracket for mounting the detector body.
Figure 3:
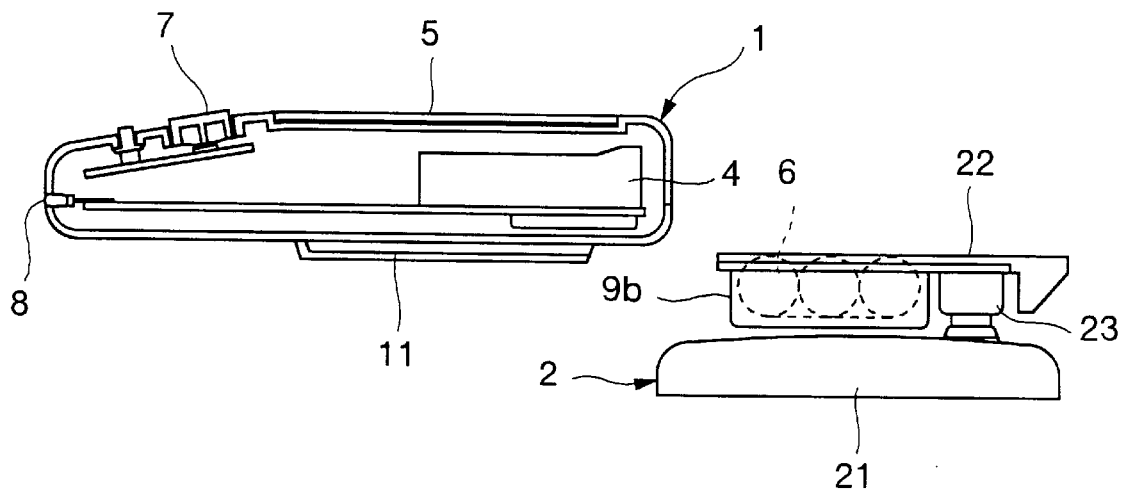

Shown in FIG. 3 is a second embodiment of a vehicular microwave detector according to the present invention. The special feature of this second embodiment is as follows. An open-space battery housing portion 9b for housing the secondary battery 6 is integrally formed in the connecting plate 22, with the upper portion of the battery housing portion 9b being an exposed opening. In this way, a portion of the connecting mechanism 11 of the device main body 1 also serves as a cover member for the battery housing portion 9b so that the battery housing portion 9b is closed when the connecting plate is coupled with the connecting mechanism 11. Thus, when the connecting plate 22 is uncoupled from the connecting mechanism 11, the upper portion of the battery housing portion 9b is exposed to enable an installed battery to be removed.

Further, although omitted from the drawings, an electrical connection is established when the connecting mechanism 11 and the connecting plate 22 are connected, so that when these elements are in a coupled state, the secondary battery 6 housed in the battery housing portion 9b is electrically connected with the circuits in the device main body 1. In this connection, FIG. 3(A) shows the device main body 1 and the bracket 2 in a coupled state, and FIG. 3(B) shows these elements in a separated state.

In accordance with the present invention, clever use is made of the connecting mechanism portion of the device main body and the bracket for internal mounting in a vehicle, and because a battery housing portion is formed so as to be opened and closed by the uncoupling and coupling of such elements, there is no need for the exclusive battery cover structure like that found in general electronic devices, and therefore, when the need arises, the present invention provides a structure that makes it easy to remove the internal secondary battery.

What is claimed is:

1. A vehicular microwave detector, comprising:

a device main body having a flat case structure;

a connecting mechanism integrally formed in the underside surface of the device main body;

a mounting bracket which is adapted to be removably coupled with the bottom of the device main body, the mounting bracket including a base plate which is adapted to be fixed to a prescribed position inside an automobile, a connecting plate which is adapted to be removably coupled with the connecting mechanism of the device main body, and a linking mechanism which links the connecting plate with the base plate;

a main circuit substrate provided inside the device main body;

a horn antenna mounted on the main circuit substrate so that the opening of the horn antenna faces one side of the case of the device main body;

a power source including a solar cell panel provided on the top of the device main body case so as to be exposed to outside light, and a secondary battery which is charged by the solar cell panel; and a battery housing portion adapted for housing the secondary battery, the battery housing portion protruding below the bottom surface of the device main body and having an open lower end, wherein the connecting mechanism is provided below the battery housing portion so that when the connecting plate is coupled with the connecting mechanism, the connecting plate also serves as a cover member to cover the battery housing portion, whereby the battery housing portion is exposed to enable the secondary battery to be removed or installed when the connecting plate is uncoupled from the connecting mechanism.

2. A vehicular microwave detector, comprising:

a device main body having a flat case structure;

a connecting mechanism integrally formed in the underside surface of the device main body;

a mounting bracket which is adapted to be removably coupled with the bottom of the device main body, the mounting bracket including a base plate which is adapted to be fixed to a prescribed position inside an automobile, a connecting plate which is adapted to be removably coupled with the connecting mechanism of the device main body, and a linking mechanism which links the connecting plate with the base plate;

a main circuit substrate provided inside the device main body along the bottom surface of the case;

a horn antenna mounted on the main circuit substrate so that the opening of the horn antenna faces one side of the case of the device main body;

a power source including a solar cell panel provided along the top of the device main body case so as to be exposed to outside light, and a secondary battery which is charged by the solar cell panel; and a battery housing portion adapted for housing the secondary battery, the battery housing portion being integrally formed in a portion of the connecting mechanism of the device main body so as to be arranged between the main circuit substrate and the connecting plate when the connecting plate is coupled with the connecting mechanism, wherein the connecting plate also serves as a cover member to cover the battery housing portion when the connecting plate is coupled with the connecting mechanism, whereby the battery housing portion is exposed to enable the secondary battery to be removed or installed when the connecting plate is uncoupled from the connecting mechanism.

3. A vehicular microwave detector, comprising:

a device main body having a flat case structure;

a connecting mechanism integrally formed in the underside surface of the device main body;

a mounting bracket which is adapted to be removably coupled with the bottom of the device main body, the mounting bracket including a base plate which is adapted to be fixed to a prescribed position inside an automobile, a connecting plate which is adapted to be removably coupled with the connecting mechanism of the device main body, and a linking mechanism which links the connecting plate with the base plate;

a main circuit substrate provided inside the device main body;

a horn antenna mounted on the main circuit substrate so that the opening of the horn antenna faces one side of the case of the device main body;

a power source including a solar cell panel provided on the top of the device main body case so as to be exposed to outside light, and a secondary battery which is charged by the solar cell panel; and a battery housing portion adapted for housing the secondary battery, the battery housing portion being an open space integrally formed in the connecting plate so as to have an opening which faces a portion of the connecting mechanism when the connecting plate is coupled with the connecting mechanism, wherein the connecting mechanism also serves as a cover member to cover the battery housing portion when the connecting plate is coupled with the connecting mechanism, whereby the battery housing portion is exposed to enable the secondary battery to be removed or installed when the connecting plate is uncoupled from the connecting mechanism.

4. The vehicular microwave detector of claim 3, wherein the coupling of the connecting mechanism and the connecting plate establishes an electrical connection, whereby the secondary battery is electrically connected to the circuit of the device main body when the connecting mechanism and connecting plate are in a coupled state.

* * * * *